Feb. 13, 1923.
R. G. AINSWORTH
WEIGHING INSTRUMENT
Filed Aug. 26, 1919
1,444,995
2 sheets-sheet 1
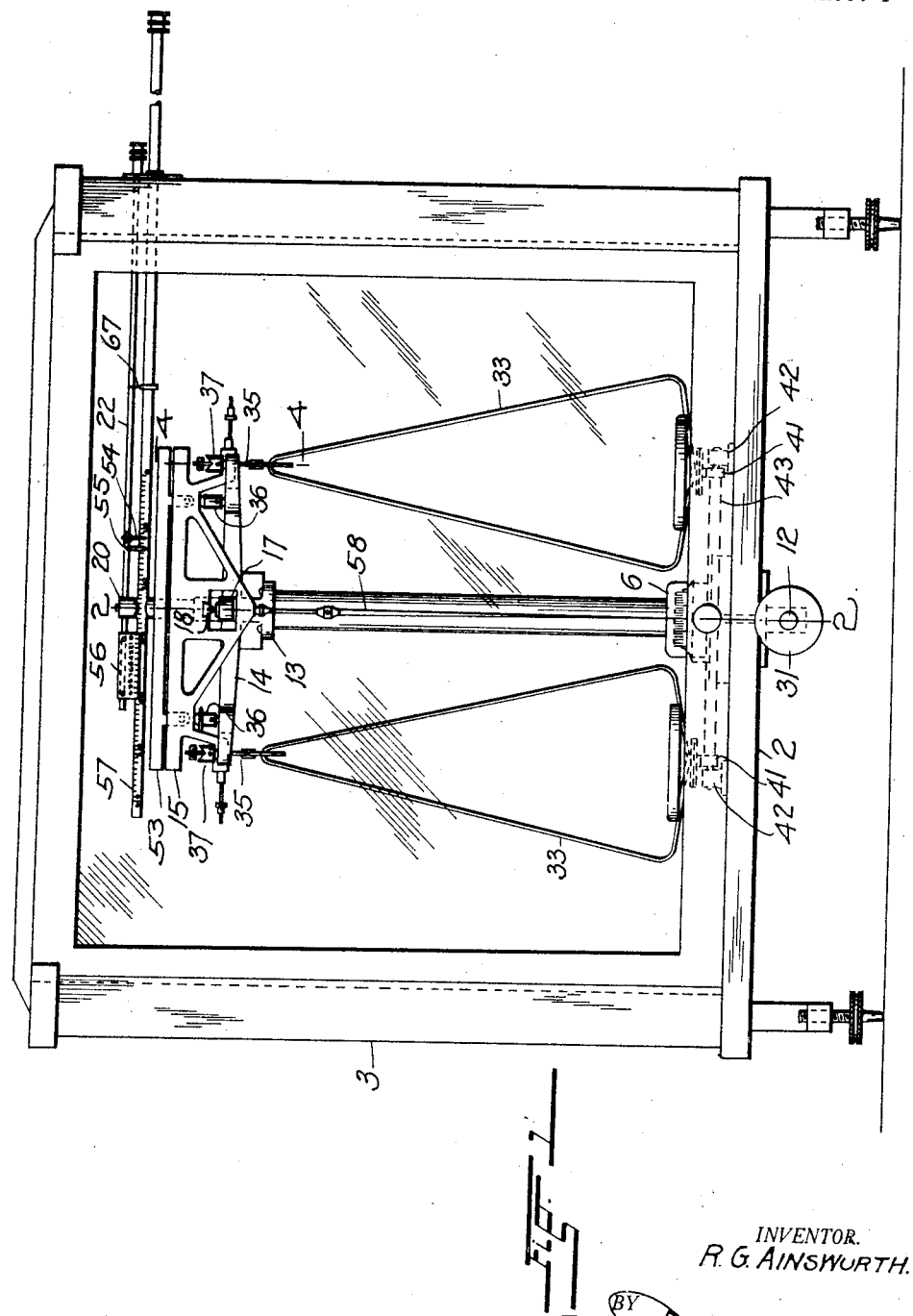
INVENTOR.
R. G. AINSWORTH.
BY
ATTORNEY.

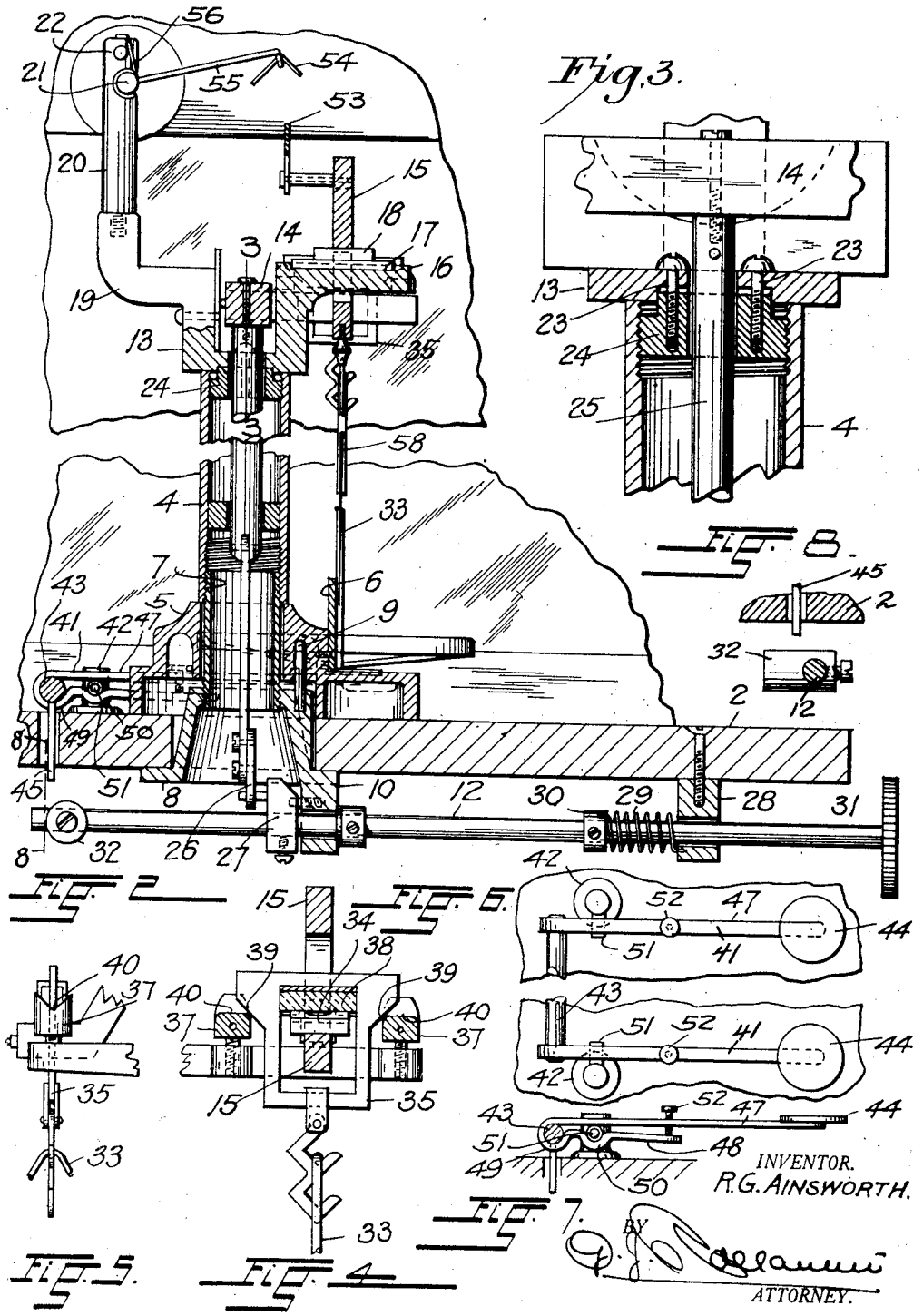

Patented Feb. 13, 1923.

1,444,995

UNITED STATES PATENT OFFICE.

ROBERT G. AINSWORTH, OF DENVER, COLORADO.

WEIGHING INSTRUMENT.

Application filed August 26, 1919. Serial No. 319,919.

*To all whom it may concern:*

Be it known that I, ROBERT G. AINSWORTH, a citizen of the United States, residing at Denver, in the county of Denver and State of Colorado, have invented certain new and useful Improvements in Weighing Instruments, of which the following is a specification.

This invention relates to precision weighing instruments and its primary object is to provide certain new and useful improvements in the construction of balances of the type used by chemists and assayers, which simplifies their construction, facilitates their operation and adjustments, and enhances the stability of their mechanism without impairment of their sensitivity.

With the above and other objects in view all of which will fully appear in the course of the following description, my invention consists of the construction, combinations and arrangement of parts shown in the accompanying drawings in the several views of which like characters of reference designate corresponding parts and in which Figure 1 is a front elevation of my improved balance, enclosed in a dust proof casing;

Figure 2, a fragmentary vertical section taken on the line 2—2, Figure 1;

Figure 3, an enlarged section taken on the line 3—3, Figure 2;

Figure 4, an enlarged section on the line 4—4, Figure 1;
Figure 5, an end view of the parts shown in Figure 4;

Figure 6, a fragmentary plan view of the pan-arrest of the instrument,

Figure 7, a side elevation of the same and Figure 8 a section on the line 8—8, Fig. 2.

Referring more specifically to the drawings, the reference character 2 designates a base plate, usually made of glass, upon which the balance is supported and which constitutes the bottom of a dust-proof casing 3 in which the weighing mechanism is enclosed.

A standard supported on the base consists of a hollow column 4 which is adjustably secured upon the base without the use of bolts or other similar fastening devices by the following combination of cooperating parts.

The base block 5 of the column which as usual carries a pair of sensitive level vials and an upright graduated index 6, rests loosely upon the base plate of the instrument and has a vertical passage through which a cylindrical bushing 7 loosely extends.

The bushing is threaded at its upper end for its connection with a correspondingly threaded end of the column and its opposite end is likewise threaded for the application of a flanged nut 8 which extends through an opening in the base plate and engages the under surface thereof.

The nut is secured against independent rotation by a dowel 9 which extends into the base block and it has an integral downwardly extending bearing 10 for the horizontal operating rod 12 of the releasing mechanism of the balance hereinafter to be described.

The bushing is the medium by which the parts of the column-support are rigidly clamped together, it being understood that when the column is screwed upon the upper end thereof into engagement with the base block, the non-rotary, flanged nut is drawn against the under surface of the base plate while the block is pressed upon the upper surface of the same.

A cap 13 supported on the column serves as usual to guide the releasing yoke 14 in its up and downward movement and also provides the bearing for the knife-edge of the balance beam 15, and bearings for the sliding rods of a vernier appliance hereinafter to be described.

The cap has to this end two upwardly extending integral parts one of which has a forwardly projecting arm 16 provided with an agate bearing block 17 for the support of the knife edge 18 of the beam, and the other of which has at the end of an oppositely projecting arm 19 an upright post 20 for the support of the rider carrier rod 21 and the therewith parallel vernier rod 22 of the vernier appliance.

The cap which rests upon the upper end of the column, is fastened by means of two screws 23 to a threaded bushing 24 which screws within the column.

After the cap has been adjusted to the position it must occupy for the proper alinement of the parts supported on the column, it is securely clamped in place by drawing the bushing 24 up against the threads of the column, by inward movement of the screws 23.

A rod 25 extending through the column and slidingly fitted in an opening of the cap supports the releasing yoke 14 of the weighing mechanism and is through the medium of a link 26 connected at its lower end with a crank arm 27 on the before-mentioned operating rod 12 which is rotatably supported in a bearing 28 below the base plate and the bearing 10 on the nut of the column fastening.

A coiled spring 29 fastened at its opposite ends to the bearing 28 and to a collar 30 on the rod serves to hold the rod in its normal position in which the releasing yoke is elevated to separate the balance beam and its hangers from their bearings.

The rod has a milled head 31 forward of the case, to facilitate its manual rotation and it has at its opposite end a laterally extending cam 32 for the adjustment of the arrest which normally checks the motion of the pan hangers 33 suspended from the beam.

The beam of the balance which is supported on the agate bearing of the cap on the column by the central knife edge 18, has agate knife-edges 34 at its ends for the suspension of the before-mentioned pan-hangers 33 through the intermediary of stirrups 35.

The releasing yoke at the upper end of the rod has the usual screw-supports 36 to raise the beam off its bearing and it carries at its extremities pairs of adjusting screws 37 which at the same time lift the stirrups above the knife-edges of the beam.

The T-shaped stirrups through which the ends of the beam project have agate bearings 38 which extend in parallel relation to the knife edges 34 of the beam to evenly engage therewith when the instrument is in its operative condition and their heads are beveled at their lower edges as at 39 to engage with the ends of the slightly rounded bottom edges 40 of V-shaped notches in the adjusting screws on the releasing yoke.

The pairs of screws at opposite ends of the yoke are separately adjustable to simultaneously engage the beveled edges of the respective stirrups when moved into engagement therewith by the upward movement of the yoke and they serve, furthermore, to center the bearings of the stirrups over the knife edges at the ends of the beam, it being understood that by slightly turning either one of the two screws upon which each stirrup is supported, a lateral displacement of the stirrup is effected, owing to the one-point contact of its beveled edges with the notches in the heads of the screws.

The pan-arrest which supports the hangers when the balance is in its inoperative condition, consists as usual of a pair of levers 41 fulcrumed on bearings 42 on the base plate of the instrument and connected by a weighted bar 43.

The levers carry at the ends of their unconnected arms, contact disks 44 which normally engage the hangers and their connecting bar has a means by which it may be lifted to separate the disks from the hangers by a corresponding movement of the levers about their alined fulcrums.

The means above referred to consist in the present construction of a pin 45 on the bar which extends loosely through an opening in the base plate to be engaged by the before-mentioned cam on the operating rod when the latter is turned to release the beam by downward movement of the yoke, the parts being relatively arranged so that the hangers will be released by downward movement of the levers subsequent to the release of the beam by downward movement of the yoke.

The levers of the pan-arrest are made of a single strip of metal 47 a portion 48 of which is bent upon itself and curved as at 49 and 50 to provide a socket for the end of the bar and a bearing to receive one of the fulcrum pins 51 projecting laterally from the bearings 42 on the base plate.

A screw 52 extending through an aperture in the body portion of the strip into a correspondingly threaded opening of the doubled portion of the same, provides a convenient means for regulating its frictional contact with the respective fulcrum pin.

The vernier appliance hereinbefore referred to has been made the subject of a separate application for patent, Serial No. 319,920, filed, August 26, 1919, and will be only briefly described at this point.

The balance beam carries a longitudinally extending straight-edge 53 for the sliding support of a V-shaped rider 54 and the before mentioned carrier rod which has a combined longitudinal and rotary movement in a bearing in the side of the case of the instrument, and a slotted bearing in the post 20 on the cap of the column, has a laterally extending arm 55 the hook-shaped extremity of which is adapted to pick the rider off the straight-edge upon which it is supported and carry it to any other point thereof.

A vernier 56 is secured at the end of a rod 22 which is slidingly supported above the other in alined bearings in the side of the case and the post, and it cooperates with a graduated scale 57 on the carrier rod to measure fractional parts of the units of measurement into which it is divided.

A pair of stops 67 on the carrier rod limits its rotary movement by engagement with the rod of the vernier and a pointer 58 on the balance beam cooperates with an index 6 on the base block to indicate the position of the beam with relation to the horizontal.

Having thus described my invention what I claim and desire to secure by Letters-Patent is:

1. A balance of the character described including a beam, a pan-hanger suspended therefrom, and an adjustable arrest for the support of the hangers, comprising a lever composed of a single strip bent upon itself and formed to provide bearings between its doubled parts, and a set-screw for varying the space between said parts.

2. A balance of the character described comprising a beam having bearings at its ends, a column for the support of the beam, stirrups suspended from said bearings, pan-hangers suspended from the stirrups, an adjustable yoke adapted to lift the beam off its support on the column, and pairs of screws on the yoke to lift the stirrups off their bearings on the beam, the screws having V-shaped notches and the stirrups having beveled edges engaging the ends of the bottom edges of the notches in the screws of the respective pair.

3. A balance of the character described comprising a beam having bearings at its ends, a column for the support of the beam, stirrups suspended from said bearings, pan-hangers suspended from the stirrups, an adjustable yoke adapted to lift the beam off its support on the column, and pairs of screws on the yoke to lift the stirrups off their bearings on the beam, the screws having V-shaped notches the bottom-edges of which are rounded at their ends, and the stirrups having beveled edges engaging said rounded ends of the notches in the screws of the respective pair.

4. A balance of the character described including a beam, a column for the support of the beam, a base-plate for the support of the column, and means for securing the column to the base-plate comprising a block resting on the base-plate, a bushing extending through the block and having a screw-thread connection with the column, and a non-rotary nut screwed upon the lower end of the bushing and bearing upon the base-plate at its under side.

5. A balance of the character described including a beam, a column for the support of the beam, a base-plate for the support of the column, mechanism to lift the beam off its support on the column, including an operating rod beneath the base-plate, and means for securing the column to the base-plate, comprising a block resting on the base-plate, and a non-rotary nut bearing upon the base-plate at its under side and having a threaded extension connected with the column, the nut having an integral-bearing for the support of the operating rod.

6. A balance of the character described including a base-plate, a column supported thereon, a beam, a cap resting on the column and having a bearing for the support of the beam, a bushing screw-threaded in the column, and clamping-screws connecting the cap with the bushing.

7. A balance of the character described including a base-plate, a column supported thereon, a beam, a cap resting on the column and having a bearing for the support of the beam, a bushing screw-threaded in the column, clamping-screws connecting the cap with the bushing, a vernier-appliance, and a post on the cap for the support of said appliance.

8. A balance of the character described including a column, a beam supported thereon, a base plate supporting the column, and means for securing the column to the base-plate, comprising a block resting on the base plate and a non-rotary nut bearing upon the plate at its under side and having a threaded extension passing through the block in connection with the column.

9. A balance of the character described, comprising a movably supported beam, pan hangers suspended at opposite ends thereof, a yoke adapted to raise the beam off its support, an adjustable arrest adapted to engage the hangers at the lower ends thereof, said arrest being composed of a pair of levers adapted for the engagement of one of their arms with the hangers, a connection between the opposite arms of the levers, and a rotary operating member having cranks one of which connects with the yoke and the other of which is adapted to lift the said connection by engagement with a part thereof, said cranks being relatively disposed to successively lower the yoke and the arrest by rotation of the member.

In testimony whereof I have affixed my signature.

ROBERT G. AINSWORTH.